United States Patent

[11] 3,618,099

[72] Inventor Frank H. Johnson
 Ridgewood, N.J.
[21] Appl. No. 880,603
[22] Filed Nov. 28, 1969
[45] Patented Nov. 2, 1971

[54] MISS DISTANCE DETERMINING HYPERBOLIC SYSTEM
10 Claims, 5 Drawing Figs.

[52] U.S. Cl. ................................................ 343/102,
 343/12 MD, 343/105 R, 343/112 CA
[51] Int. Cl. ........................................................ G01s 1/04
[50] Field of Search ................................................ 343/112 D,
 105, 12 MD, 102

[56] References Cited
UNITED STATES PATENTS
2,958,866 11/1960 Atanasoff ..................... 343/112 D X
3,333,264 7/1967 Knepper ....................... 343/12 MD X Primary Examiner—Rodney D. Bennett, Jr.
Assistant Examiner—Richard E. Berger
Attorneys—C. Cornell Remsen, Jr., Walter J. Baum, Paul W. Hemminger, Percy P. Lantzy, Philip M. Bolton, Isidore Togut and Charles L. Johnson, Jr.

ABSTRACT: To determine continuously the minimum distance by which a first moving vehicle will travel past a second moving vehicle, there is transmitted from said second vehicle four frequencies, $f_1$, $f_2$, $f_3$ and $f_4$, which provide in space two sets of moving isophases which alternate direction of travel. A receiver at said first vehicle having three spaded antennas measures the velocity of the isophases as they sweep past said antennas by a phase comparison of the signals received at each antenna. The sum of the measured velocities corresponding to the alternating isophases and the measured velocity of the other isophases are coupled to a computer which determines therefrom the minimum miss distance.

INVENTOR
*FRANK H. JOHNSON*
BY *Philip M. Bolton*
ATTORNEY

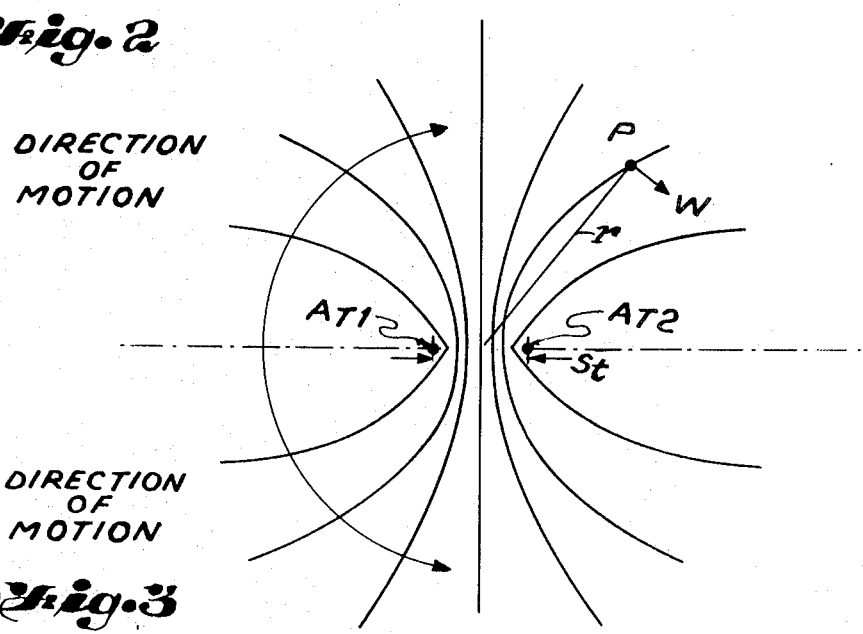
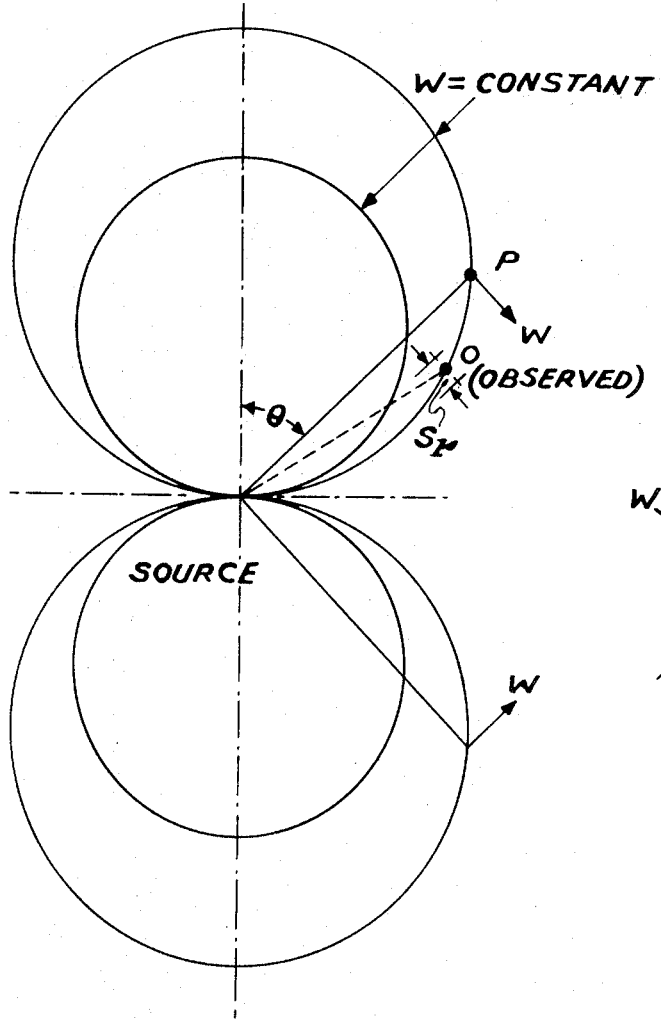
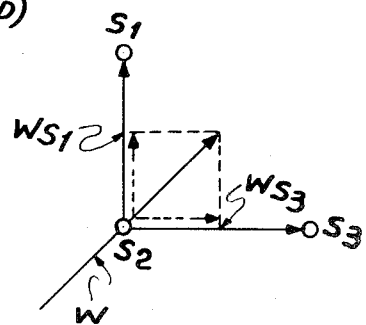
INVENTOR
FRANK H. JOHNSON
BY Philip M Bolton
ATTORNEY INVENTOR
FRANK H. JOHNSON
BY Philip ... Bolton
ATTORNEY

MISS DISTANCE DETERMINING HYPERBOLIC SYSTEM

BACKGROUND OF THE INVENTION

1. Field of the Invention

The present invention relates generally to a hyperbolic navigation system, and more particularly, to one wherein a transmitter on a vehicle provides moving isophase lines and a receiver on another vehicle measures the phase velocity of said isophase lines as they sweep past to determine therefrom the minimum distance by which said vehicles will pass one another.

2. Description of the Prior Art

It is generally known that if the position and velocity, relative to a reference, of moving crafts is submitted to a computer, that one can predict the distances by which the moving vehicle will pass one another. Such schemes require the transmission of a reference signal, position and velocity information may be measured with respect to that reference.

The reference signal required must be highly stable and accurate. However, errors of said reference signals, when received, usually deprive the overall system of the required accuracies.

Further, systems as above-described require as implementing equipment, that, as a minimum, a receiver and a transmitter be installed in each and every vehicle if miss distances are to be obtained. This requirement imposes a severe financial burden on the owners of small and inexpensive vehicles because the cost of a receiver which accurately utilizes the receiver reference signal is relatively high.

SUMMARY OF THE INVENTION

It is an object of the present invention to provide an improved hyperbolic navigation system and particularly to provide an improved receiver therefore.

It is another object of the invention to provide a collision avoidance navigation system wherein an extremely accurate reference signal is not required.

It is a further object of the invention to provide a system wherein all vehicles which are supplied with receivers will be able to determine the miss distance between themselves and a transmitting vehicle.

According to the invention there is provided a receiver for a navigation system in which moving isophase lines are emitted by a transmitter which comprises means for detecting said isophase lines, first means for measuring the velocity with which said isophase lines pass said detecting means, second means for measuring the sum of preselected ones of said measured velocities and means for deriving miss distance information from said first and second means for measuring.

BRIEF DESCRIPTION OF THE DRAWINGS

The above-mentioned and other objects of this invention will become apparent by reference to the following description in conjunction with the accompanying drawings, in which:

FIG. 2 illustrates a rotating isophase pattern in a plane useful in explaining the underlying theory of the invention;

FIG. 3 illustrates constant wash rate contours useful for determining position and radial relative velocity;

FIG. 5 illustrates a resolution of the wash rate vector W; and

DESCRIPTION OF THE PREFERRED EMBODIMENT

In order to facilitate the comprehension of the theory of the subject invention, the following description is restricted to those events which occur in a plane. The three-dimensional case will be obvious to those skilled in the art.

Figure 1:
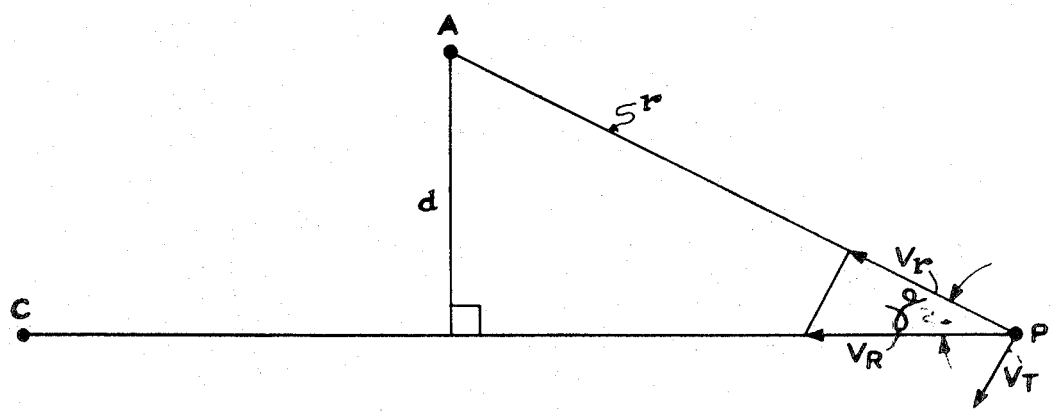
FIG. 1 illustrates geometrical relationships between moving objects useful in explaining the underlying theory of the invention.

In FIG. 1 there is shown a reference point A which represents a first vehicle and a point P which represents a second vehicle. A and P are separated by a vector distance $r$ and P is assumed to move toward point C with a velocity $V_R$ relative to A. $V_R$ may be resolved into component vector $V_r$ along the distance vector $r$, and $V_t$ perpendicular to said distance vector. Considering the geometry, the closest distance which the second vehicle will assume with respect to the first vehicle is $d$. However, $d = r \sin \alpha$
$\sin \alpha = (V_t/V_R)$
$d = (r/V_R) \times V_t$ and $d \approx (r/V_r) \times V_T$ for small values of $\alpha$.

From the above approximation, made to simplify hardware implementation, it is obvious that the vector distance $r$ between said second vehicle and said first vehicle and the normal and tangential values of velocity of said second vehicle with respect to said first vehicle are all that is required to be known to continuously determine the nearest distance that one will assume with respect to the other if it continues to travel such that it has the same relative velocity.

In order to determine the above-mentioned parameters, use is made of the fact that two spaced antennas, $A_{T1}$ and $A_{T2}$, each of which radiate a CW signal, namely $f_1$ and $f_2$, said signals differing by a fixed frequency difference $\Delta f$, provide in the far field of said antenna pair a spacial pattern of rotating isophase contours. As is well-known, said isophase contours move from the higher frequency antenna to the lower frequency antenna as shown in FIG. 2.

The velocity of said isophases in the far field as they move past any point in a plane containing $A_{T1}$ and $A_{T2}$, measured in a direction perpendicular to a radius vector drawn to said point, is defined as the wash rate and will hereinafter, generally, be designated W.

Figure 4:
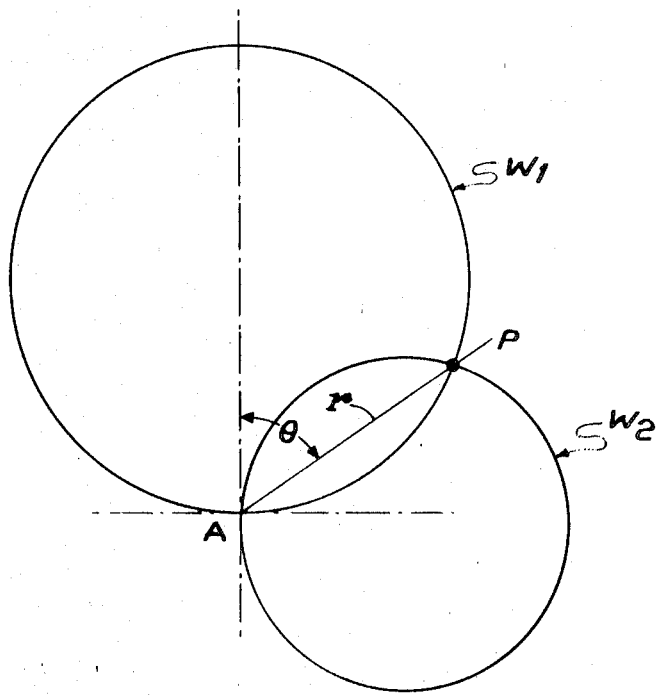
FIG. 4 geometrically illustrates a determination of position utilizing more than one constant wash rate contour.

As illustrated in FIG. 3 it can be shown that the locus of points for given wash rate magnitudes are circles defined by:

$W = Mr/\cos\theta$ where $r$ = range
$M = C\Delta f/S_t$ for
$S_t$ = Distance between antennas
$C$ = Velocity of light
$\Delta f$ = Frequency difference
$\sigma$ = Frequency sum Therefore, a measure of W at the second vehicle defines a relationship between $r$ and $\theta$. A second similar pair of antennas, $A_{T3}$ and $A_{T4}$ for example, transmitting $f_3$ and $f_4$ and located perpendicular, or in general not colinear to the first pair of antennas on said first vehicle, can be used to provide a second independent relationship between $r$ and $\theta$ which in conjunction with the first measurement may be used to solve for $r$ and $\theta$ explicitly and $V_R$ derivatively. FIG. 4 graphically illustrates such a solution.

When the second vehicle at P is moving with respect to the transmitting antennas, a measure of the wash rate at said point will include an error due to its motion. However, if the frequencies transmitted by a pair of the antennas, $f_1$ and $f_2$ for example, are periodically interchanged between $A_{T1}$ and $A_{T2}$, one half the sum of the measured wash rates due to said antenna switching yields a measure of the relative velocity $V_R$ of said second vehicle along a direction perpendicular to the direction vector $r$ as well as a correction factor for establishing the true wash rate at point P.

Wash rate is measured, as shown in FIG. 5 for example, by measuring the component wash rate vectors $W_{S1}$ and $W_{S3}$ in the direction of spaced pairs of antennas $S_1$, $S_2$ and $S_2$, $S_3$ located at said second vehicle at P and computing the resultant in a computer. Since the antenna separation is fixed, the component vectors are measured by comparing the phases of signals received at the separate antennas.

Figure 6:
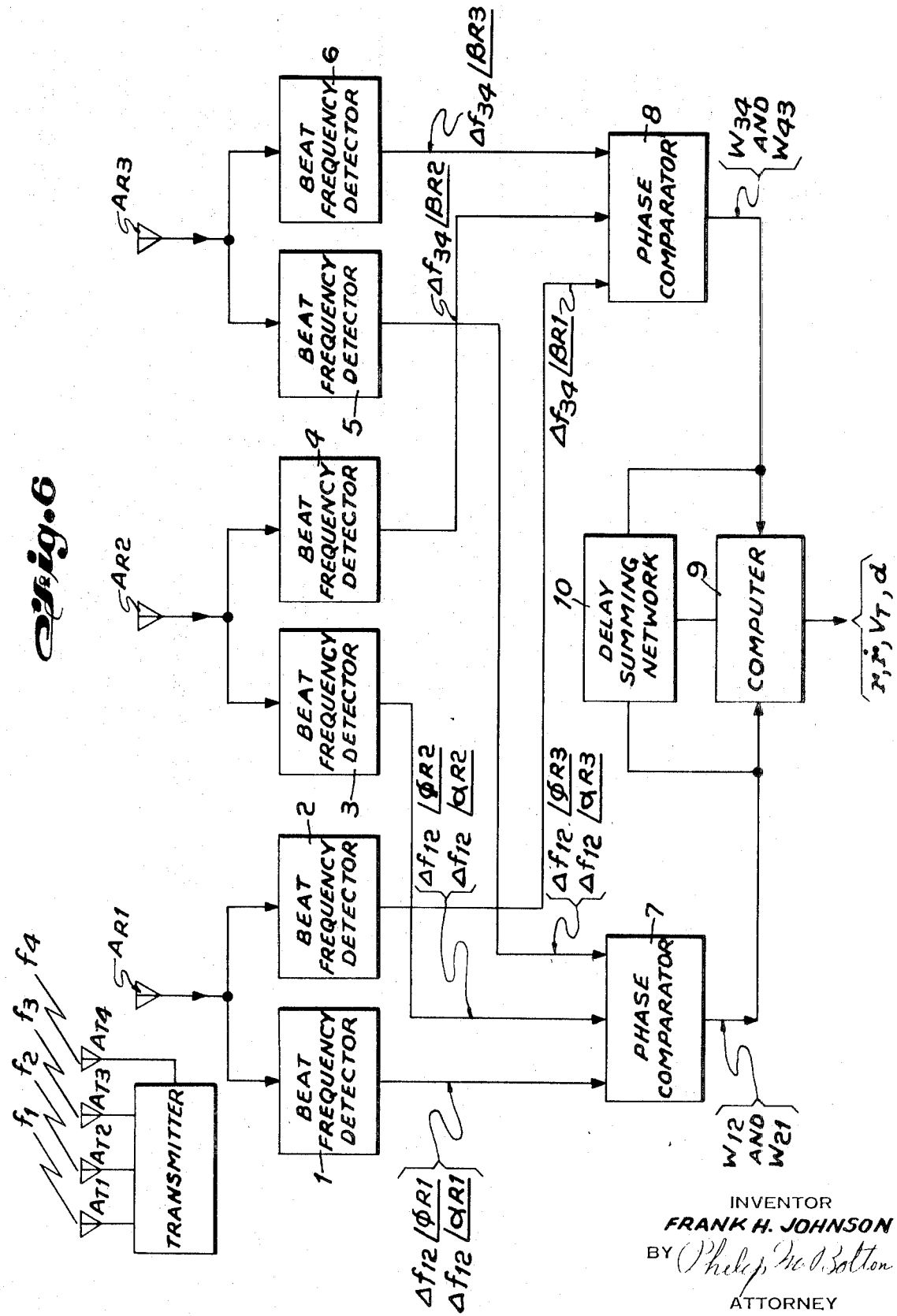
FIG. 6 is a system block diagram of a miss distance determining navigation system.

In an embodiment, as shown in FIG. 6, two sets of isophase lines are provided by transmitting antennas $A_{T1}$, $A_{T2}$, $A_{T3}$ and $A_{T4}$ radiating signals having frequencies $f_1$, $f_2$, $f_3$ and $f_4$ respectively. The frequency difference between $f_1$ and $f_2$ and between $f_3$ and $f_4$ are $\Delta f_{12}$ and $\Delta f_{34}$ respectively. In operation the pairs of signals $f_1$ and $f_2$ are alternately interchanged and transmitted by $A_{T1}$ and $A_{T2}$ thus causing the isophases generated by frequencies $f_1$ and $f_2$ to alternately move in different directions.

In a receiver, antenna $A_{R1}$ is coupled to beat frequency detectors 1 and 2; antenna $A_{R2}$ is coupled to beat frequency detectors 3 and 4; and antenna $A_{R3}$ is coupled to beat frequency detectors 5 and 6. The output of the respective beat frequency detectors 1, 3 and 5 are $\Delta f_{12} \angle \theta_{R1}$, $\Delta f_{12} \angle \theta_{R2}$, $\Delta f_{12} \angle \theta_{R3}$ and alternately $\Delta f_{12} \angle \alpha_{R1}$, $\Delta f_{12} \angle \alpha_{R2}$, $\Delta f_{12} \angle \alpha_{R3}$. The output of the respective beat frequency detectors 2, 4 and 6 are $\Delta f_{34} \angle \beta_{R1}$, $\Delta f_{34} \angle \beta_{R2}$, $\Delta f_{34} \angle \beta_{R3}$ and alternatively $\Delta f_{34} \angle \gamma_{R1}$, $\Delta f_{34} \angle \gamma_{R2}$ and $\Delta f_{34} \angle \gamma_{R3}$. The outputs of beat frequency detectors 1, 3, 5 and 2, 4, 6 are coupled to phase comparators 7 and 8 respectively. Phase comparators 7 and 8 are coupled to computer 9 and provide the value of the wash rate vectors $W_{12}$, $W_{21}$ and $W_{34}$, $W_{43}$ corresponding to isophases generated by $f_1$, $f_2$ and $f_3$, $f_4$ respectively. The output of phase comparator 7 is coupled to a delay and summing network 10 wherein the sum of wash rate vectors $W_{21}$ and $W_{12}$ is obtained. The output of the delay and summing network is coupled to computer 9 which, from the inputs $(W_{21}+W_{12})$, $W_{12}$, $W_{21}$, and $W_{34}$, $W_{43}$, $(W_{43}+W_{34})$ solves for $r$, $V_r$, $\theta$ and $d$, the miss distance.

In the above system, it is not necessary that the transmitter transmit continuously. In fact, in order to conserve bandwidth when more than one transmitter is under surveillance, transmission and reception may be frequency and time multiplexed.

I claim:

1. A receiver for a navigation system in which moving isophase lines are emitted by a transmitter, comprising:
means for detecting said isophase lines;
first means for measuring the velocities with which said isophase lines pass said detecting means;
second means for measuring the sum of preselected ones of said measured velocities; and
means for deriving miss distance information from said first and second means for measuring.

2. A receiver for a navigation system, according to claim 1, wherein said means for detecting said isophase lines comprises three or more antennas.

3. A receiver for a navigation system, according to claim 1, wherein said means for measuring the velocity with which said isophase lines pass said detecting means comprises beat frequency detecting means coupled to said means for detecting said isophase lines and means for determining the phase differences between said beat frequencies.

4. A receiver for a navigation system, according to claim 3, wherein said means for measuring the sum of preselected ones of said measured velocities includes a delay and summing circuit.

5. A receiver for a navigation system, according to claim 3, wherein said means for deriving miss distance information includes a computer.

6. A navigation system comprising:
a transmitter having means for transmitting moving isophase lines; and
a receiver responsive to said moving isophase lines for determining therefrom navigation parameters including miss distance.

7. A navigation system, according to claim 6, wherein said transmitter provides one set of continuously moving isophase lines and one set of oscillating isophase lines.

8. A navigation system, according to claim 7, wherein said receiver comprises:
means for detecting said isophase lines;
first means for measuring the velocities with which said isophase lines pass said detecting means;
second means for measuring the sum of preselected ones of said measured velocities; and
means for deriving miss distance information from said first and second means for measuring.

9. A navigation system, according to claim 8, wherein said means for detecting said isophase lines comprises three or more antennas.

10. A navigation system, according to claim 8, wherein said means for measuring the velocity with which said isophase lines pass said detecting means comprises beat frequency detecting means coupled to said means for detecting said isophase lines and means for determining the phase differences between said beat frequencies.

* * * * *

UNITED STATES PATENT OFFICE
CERTIFICATE OF CORRECTION

Patent No.     3,618,099          Dated    November 2, 1971

Inventor(s)    Frank H. Johnson

It is certified that error appears in the above-identified patent and that said Letters Patent are hereby corrected as shown below:

Assignee      International Telephone and Telegraph
                         Corporation
                         Nutley, N.J.

Signed and sealed this 20th day of June 1972.

(SEAL)
Attest:

EDWARD M. FLETCHER, JR.         ROBERT GOTTSCHALK
Attesting Officer                Commissioner of Patents